Figure 1:
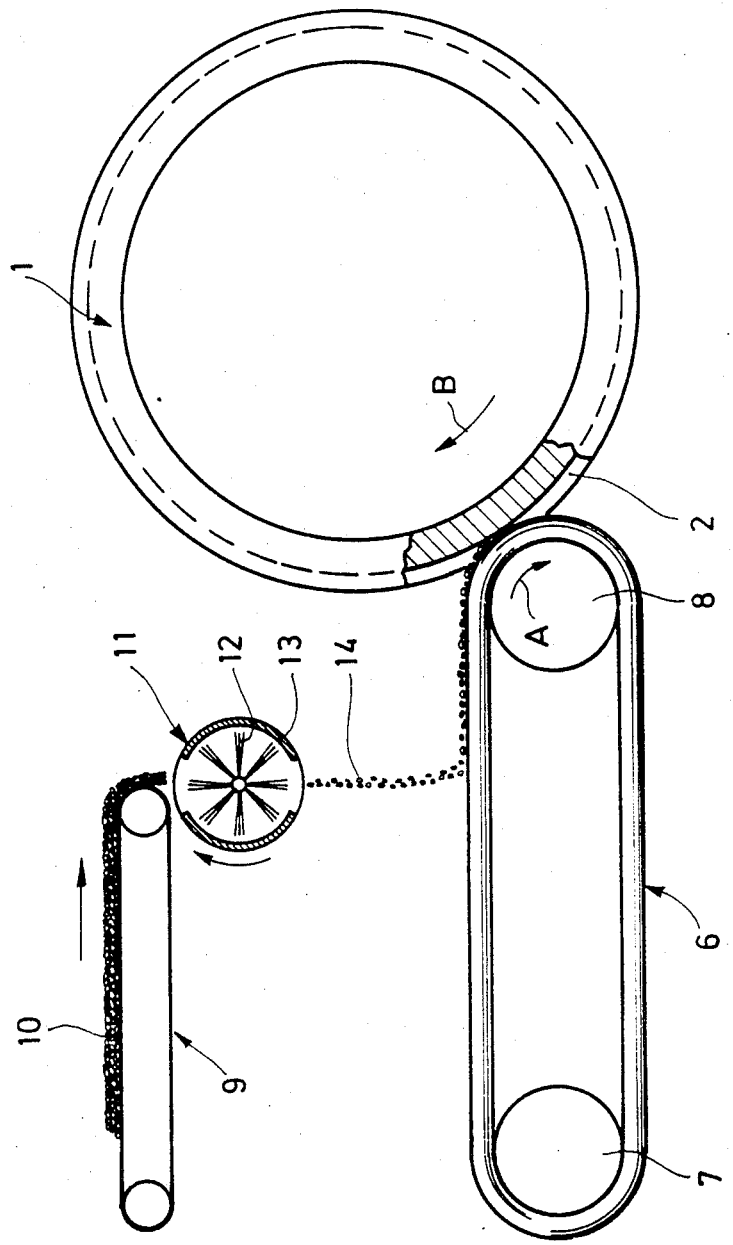

United States Patent [19]

Kullman, deceased et al.

[11] Patent Number: 4,788,932

[45] Date of Patent: Dec. 6, 1988

[54] DEVICE FOR COATING THE GROOVE OF A BALL BEARING WITH A POWDER-TYPE SOLID LUBRICATING MATERIAL

[75] Inventors: Werner Kullman, deceased, late of Munich; Ursula Spang, heir, Saarbrücken; Volker Buck, Hattingen, all of Fed. Rep. of Germany

[73] Assignee: Deutsche Forschungs- und Versuchanstalt Fur Luft- und Raumfahrt e.V., Cologne, Fed. Rep. of Germany

[21] Appl. No.: 16,241

[22] Filed: Feb. 19, 1987

[30] Foreign Application Priority Data

Feb. 25, 1986 [DE] Fed. Rep. of Germany ....... 3605968

[51] Int. Cl.$^4$ .............................................. B05C 1/02
[52] U.S. Cl. .................... 118/211; 118/232; 118/215; 118/257
[58] Field of Search ............. 118/215, 218, 219, 232, 118/257, 211

[56] References Cited

U.S. PATENT DOCUMENTS

| 870,807 | 11/1907 | Twigg .......................... 118/257 X |
| 2,423,880 | 7/1947 | Graaf . |
| 3,075,279 | 1/1963 | Haltner ........................... 29/149.5 |
| 3,387,985 | 6/1968 | Huber . |
| 3,389,009 | 6/1968 | McNulty . |
| 3,710,753 | 1/1973 | Birchall et al. ................. 118/232 X |
| 4,070,987 | 1/1978 | Gross ................................. 118/257 |

FOREIGN PATENT DOCUMENTS

| 1105321 | 4/1961 | Fed. Rep. of Germany ...... 118/257 |
| 2641899 | 5/1977 | Fed. Rep. of Germany . |
| 493857 | 10/1938 | United Kingdom . |

*Primary Examiner*—John McIntosh
*Attorney, Agent, or Firm*—Wolf, Greenfield & Sacks

[57] ABSTRACT

In a device for coating the groove of a ball bearing with a powder-type lubricating material, in particular molybdenum sulfide, with a polishing component that enters the groove and is movable in relation to the groove, it is proposed, in order to increase the evenness of the coating and at the same time to prevent the area outside the rolling area of the groove from being coated, that the polishing component touch only that area on the groove over which the balls of the ball bearings roll, and that a feed device for the powder-type solid lubricant be provided which applies that lubricant to the polishing component outside the area where the polishing component touches the groove, in an area of the polishing component which comes into contact with the groove during relative movement between the polishing component and the groove.

3 Claims, 2 Drawing Sheets

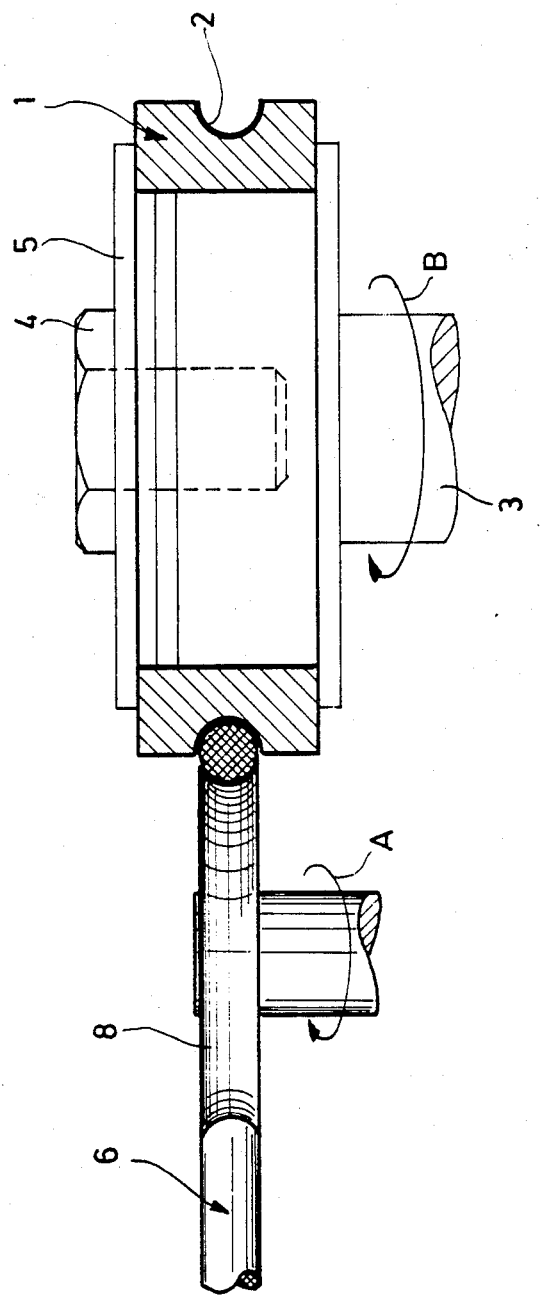

DEVICE FOR COATING THE GROOVE OF A BALL BEARING WITH A POWDER-TYPE SOLID LUBRICATING MATERIAL

DESCRIPTION

The invention concerns a device for coating the groove of a ball bearing with a powder-type solid lubricant, in particular molybdenum sulfide, with a polishing component that enters the groove and is movable in relation to the groove.

Solid lubricating materials such as molybdenum sulfide ($MoS_2$) are often used in space technology, for example. In a layered structure in which the uppermost layer is created by applying powder-type lubicating material, excellent tribologic properties can be achieved. In such cases the powder-type solid lubricating materials are usually applied by rubbing or polishing with cloth, sponges and similar flexible fixing components. (e.g. W. Hellwig and G. Spengler DEUTSCHE LUFT- UND RAUMFAHRT, Forschungsberichte 72-69 and 71-03, 1972, and G. Spengler, W. Hellwig and F. Wunsch in DEUTSCHE LUFT- UND RAUMFAHRT, Forschungsbericht 68-18, 1968). The application of these solid lubricating materials on the surface of bearings is also possible by other methods, for example by application in the form of suspending and subsequently evaporating the solvent or by formation in situ (DE-PS No. 24 15 255).

In known procedures for dry application of powder-type solid lubricants, the usual procedure has been to pour the powder-type solid lubricant into the groove of the ball-bearing or the like that is to be coated and then to press it against the wall of the groove by means of a polishing component that is inserted into it. In this method, not only is the groove of the ring bearing coated in the area over which the balls of the bearing will later roll, but the entire wall area of the groove is also coated, as well as the bordering area. The coating is usually not compacted in the necessary fashion until the balls roll over it; in the area over which the balls do not roll, therefore, no such compacting occurs, so that with bearings coated in this way, there is the danger that the solid lubricating material will later become detached in those areas of the groove over which the balls do not roll, for example during the strong mechanical stress of a rocket launch. Another disadvantage of this procedure is that the coating can become uneven in thickness, on the one hand because the supply of solid lubricant in the groove is pressed unevenly by the polishing component onto the area to be coated, and on the other hand because the polishing component is not precisely aligned in relation to the groove. This danger is particularly in evidence when the polishing component is, in the known fashion, in the shape of a finger that enters the laterally open groove and is moved along this groove. The path of motion of this finger must then be exactly aligned to the geometry of the groove, and it is hardly possible to do this with the required accuracy.

The goal of the invention is to improve on a device type in such a way that during the powder coating of a bearing groove only those areas over which the bearing rollers will travel in the finished bearing are coated with solid lubricating material. Also, the evenness of the coating over the entire coated surface is to be improved.

The invention achieves this goal in a device of the type mentioned at the beginning by having the polishing component touch the groove only in the area over which the balls of the ball bearings roll, and by providing for a feed device for the powder-type solid lubricant which applies the lubricant to the polishing component outside the area where the polishing component touches the groove, in an area of the polishing component that comes into contact with the groove during relative movement between the polishing component and the groove.

Thus, in this device, the polishing device does not distribute over the groove a supply of solid lubricant that was inserted beforehand into the groove; instead, the solid lubricant is brought there with the polishing component itself. This ensures that the only area to be coated is where the polishing component touches the surface of the groove. By correspondingly selecting the cross section of the polishing component, it can be ensured that the surface thus coated corresponds exactly to the surface over which the balls or rollers of the bearing will roll.

In this fashion, the amount of solid lubricant can be precisely dosed, so that there is no excess solid lubricant in the groove. This ensures that the thickness of the layer will remain constant in the entire groove area, since there are no uncontrollable excess amounts that could be polished in varying thickness onto the wall of the groove.

It is particularly advantageous when the polishing component is an O-ring that enters the groove to be coated. Then a relative movement is generated between the groove and the O-ring in the longitudinal direction of the O-ring; preferably, the O-ring and the groove rotate in opposite directions. There are no aligning problems in such a configuration, as the ring-shaped ball bearing and a guide roll for the O-ring can be exactly aligned relative to one another.

It is favorable to have the diameter of the O-ring equal to or smaller than the diameter of the groove. In this way it is possible, for example, if the groove is semicircular, not to coat the entire area of the semicircle, but to coat it only in the lower-lying area over which the balls will roll during operation. In this case it is advantageous if the diameter of the race corresponds to that of the balls.

In connection with the diagram, the following description of a preferable design form of the invention explains it in more detail. The figures show the following:

FIG. 1 A schematic side view of a coating device

FIG. 2 A schematic longitudinal cross section of a part of the device in FIG. 1

With the device pictured in FIG. 1, the groove 2 of an inner race 1 of a ball bearing can be coated. To this end, the race 1 with the groove 2, which has a semicircular cross section, is mounted on a rotatable shaft 3 by means of a screw 4 and a tightening disk 5 in such a way that the axis of rotation of the shaft 3 runs precisely coaxial to the rotation axis of the race 1 (FIG. 2).

An O-ring 6 made of a soft elastic material, for example Perbunan, is run over two guide rollers 7 and 8, at least one of which is drivable. The arrangement is such that the end of the upper side of the O-ring 6 enters groove 2 of race 1. To this end, the guide rollers 7 and 8 are precisely adjustable to the longitudinal middle level of the race 1, and this configuration is pressed onto the groove by means of spring power (FIG. 2). The guide rollers are driven in such a fashion that the O-ring 6 and the race 1 run in opposite directions, as indicated by arrows A and B in the diagram.

The cross section of O-ring 6 is at most the size of the cross section of groove 2; it can be smaller.

Above O-ring 6 is a conveyor device 9 for a powder-type solid lubricant 10; in the design example shown, it is a conveyor belt. This conveys powdered solid lubricant 10 into a spraying and dosing device 11 located under its end; in the design example shown, it is a brush doser with a rotating brush 12 in a case 13 which is open at the top and the bottom.

The stream of dosed solid lubricant 14, which emerges from the spraying and dosing device 11 on the underside of the case 13, falls from above onto the upper side of the O-ring, so that the O-ring takes the lubricant particles falling onto it along in its direction of rotation and conveys them into groove 2. In the area of contact between the O-ring and the inner wall of groove 2, the particles of solid lubricant carried there are polished against the inner wall of groove 2, to which they adhere. The solid lubricant is pressed only in the area where the O-ring touches the inner wall of groove 2. With the corresponding choice of dimensions of the O-ring, this area can be chosen to conform precisely to the rolling area of the balls of the ball bearing on the inner race 1.

With the aid of conveyor device 9 and the spraying and dosing device 11, the strength of the stream of solid lubricant 14 can be varied so that the rate of application to the inner surface of groove 2 can be varied. This is to ensure, in particular, that no excess lubricant gets into the groove and causes an undesired deposition of lubricant particles outside the actual area on the inner wall of the groove over which the balls of the ball bearings roll.

In a practical coating, the pressing power could, for example, be in the range of 0 to 1N, the polishing time in the range of 0 to 60 minutes, with a relative speed in the range of 0 to 10 m per minute between the O-ring on the one hand and the groove on the other. The polishing rate is preferably in the range between 0 and 20 mg per square meter and second.

We claim:

1. Device for coating the groove of a ball bearing with a powder-type solid lubricant, in particular molybdenum sulfide, comprising
   an O-ring polisher which enters the groove,
   means for moving said O-ring relative to the groove,
   said O-ring having a diameter that is at most equal to the diameter of the groove so that it touches the groove only in the area over which the balls of the ball bearing roll, and
   a feeding device for the powder-type solid lubricant which applies the lubricant to the O-ring at a region located outside the area of contact between said O-ring and the groove over a portion of said O-ring that comes into contact with the groove during said relative movement between said O-ring and the groove.

2. Device according to claim 1, wherein said moving means rotates said O-ring and the groove in opposite directions.

3. Device according to claim 1, wherein said moving means includes a guide roller that guides said O-ring and the distance between said guide roller and the groove is adjustable.

* * * * *